(12) United States Patent
Chen et al.

(10) Patent No.: US 8,345,422 B2
(45) Date of Patent: Jan. 1, 2013

(54) LATCHING MECHANISM AND ELECTRONIC DEVICE USING SAME

(75) Inventors: Rui-Hao Chen, Shenzhen (CN); Zhi-Fu Zhong, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 306 days.

(21) Appl. No.: 12/905,219

(22) Filed: Oct. 15, 2010

(65) Prior Publication Data

US 2012/0039025 A1 Feb. 16, 2012

(51) Int. Cl.
*G06F 1/16* (2006.01)
(52) U.S. Cl. .................. 361/679.58; 455/575.1
(58) Field of Classification Search ............ 361/679.58; 292/179; 455/575.1
See application file for complete search history.

(56) References Cited

U.S. PATENT DOCUMENTS

| | | | | |
|---|---|---|---|---|
| 7,660,560 B2 * | 2/2010 | Zuo et al. | | 455/90.3 |
| 7,711,111 B2 * | 5/2010 | Chuang | | 379/433.11 |
| 7,855,884 B2 * | 12/2010 | Dong | | 361/679.58 |
| 7,986,524 B2 * | 7/2011 | Dong et al. | | 361/679.55 |
| 8,241,777 B2 * | 8/2012 | Dong et al. | | 429/100 |
| 2001/0007823 A1 * | 7/2001 | Lee | | 455/573 |
| 2003/0022633 A1 * | 1/2003 | Chen | | 455/90 |
| 2006/0172183 A1 * | 8/2006 | Chen et al. | | 429/97 |
| 2007/0026297 A1 * | 2/2007 | Qin et al. | | 429/97 |
| 2007/0087263 A1 * | 4/2007 | Ge et al. | | 429/97 |
| 2010/0124697 A1 * | 5/2010 | Chen et al. | | 429/97 |

FOREIGN PATENT DOCUMENTS

CN 101740735 A 6/2012

* cited by examiner

*Primary Examiner* — Lisa Lea Edmonds
(74) *Attorney, Agent, or Firm* — Altis Law Group, Inc.

(57) ABSTRACT

A latching mechanism for a portable electronic device includes a housing, a cover, a button, a latching member and at least one elastic member. The housing defines a latching hole. The cover defines a guide slot along a first direction. The button is assembled in the cover and movable along the guide slot. The latching member is secured with the button in a first direction and movable along a second direction, perpendicular with the first direction. The at least one elastic member is assembled between the button and the latching member. The latching member latches into the latching hole to secure the cover with the housing in the first direction. The button is pushed and slides along the guide slot. The latching member slides out the latching hole to unlatch the cover in the first direction.

16 Claims, 6 Drawing Sheets

LATCHING MECHANISM AND ELECTRONIC DEVICE USING SAME

BACKGROUND

1. Technical Field

The disclosure relates to latching mechanisms and electronic devices; and particularly to a latching mechanism for latching a cover to a housing of an electronic device.

2. Description of Related Art

Portable electronic devices such as mobile phones are widely used. When a battery is installed in the portable electronic device, the battery may be shielded and secured in place by a cover. The cover is latched to a housing of the portable electronic device.

The cover typically includes a pin at one end and a protrusion at an opposite end. The housing defines a receiving hole and a holding aperture. The protrusion can be received in the holding aperture, and the cover pushed towards the housing until the pin is received in the receiving hole. As such, the cover secures the housing with the protrusion held in the holding aperture. However, the disengagement of the cover relative to the housing may require a removal of the pin from the receiving hole by exerting a large external force.

Therefore, there is room for improvement within the art.

BRIEF DESCRIPTION OF THE DRAWINGS

Many aspects of the present latching mechanism and electronic device using the same can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
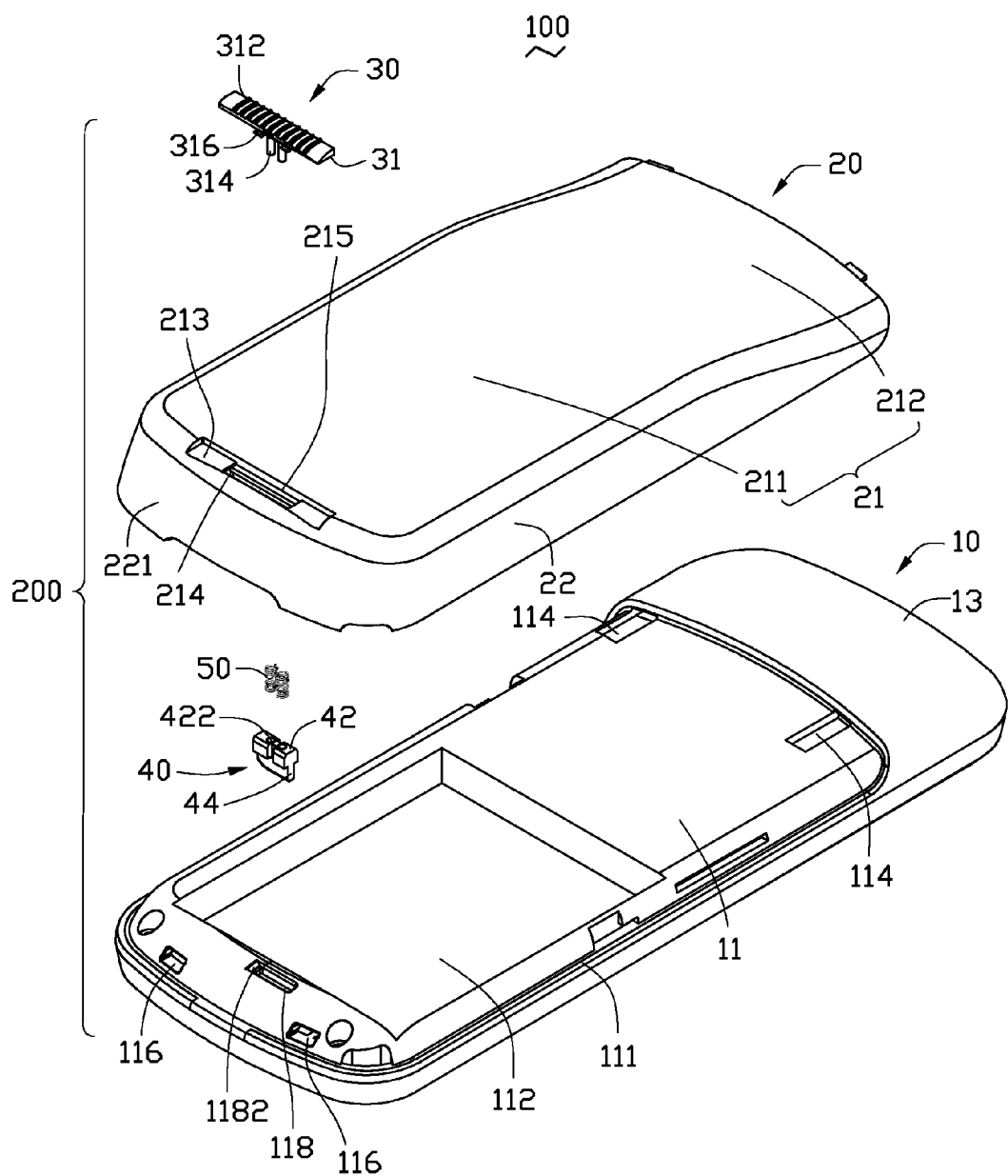
FIG. 1 is a disassembled view of a portable electronic device having a latching mechanism as disclosed.

FIG. 1 shows a portable electronic device 100 such as a mobile phone according to an exemplary embodiment. The portable electronic device 100 includes a housing 10, a cover 20, a button 30, a latching member 40 and elastic members 50. The housing 10, the cover 20, the button 30, the latching member 40 and the elastic members 50 cooperatively engage with each other as a latching mechanism 200 for latching the housing 10 to the cover 20.

The housing 10 has a latching section 11 and a base section 13 at the rear surface. The latching section 11 engages with the cover 20. The latching section 11 defines a peripheral step groove 111 at the periphery. The latching section 11 defines a receiving compartment 112 distal to the base section 13. The receiving compartment 112 is for receiving a battery (not shown). The latching section 11 defines two first latching recesses 114 abutting the base section 13. The latching section 11 further defines two second latching recesses 116 opposite to the two first latching recesses 114. The first latching recesses 114 and the second latching recesses 116 extend along a first direction, which is a horizontal direction in the present exemplary embodiment, and can secure the cover 20 in the second direction. The second direction is perpendicular with the first direction and can be a vertical direction in the present exemplary embodiment. The latching section 11 further defines a latching hole 118 adjacent to the two second latching recesses 116. The latching hole 118 engages with the latching member 40 and can latch the latching member 40. The latching hole 118 has a slanted wall 1182 at a lateral side for facilitating engagement between the latching member 40 and the latching hole 118.

Figure 2:
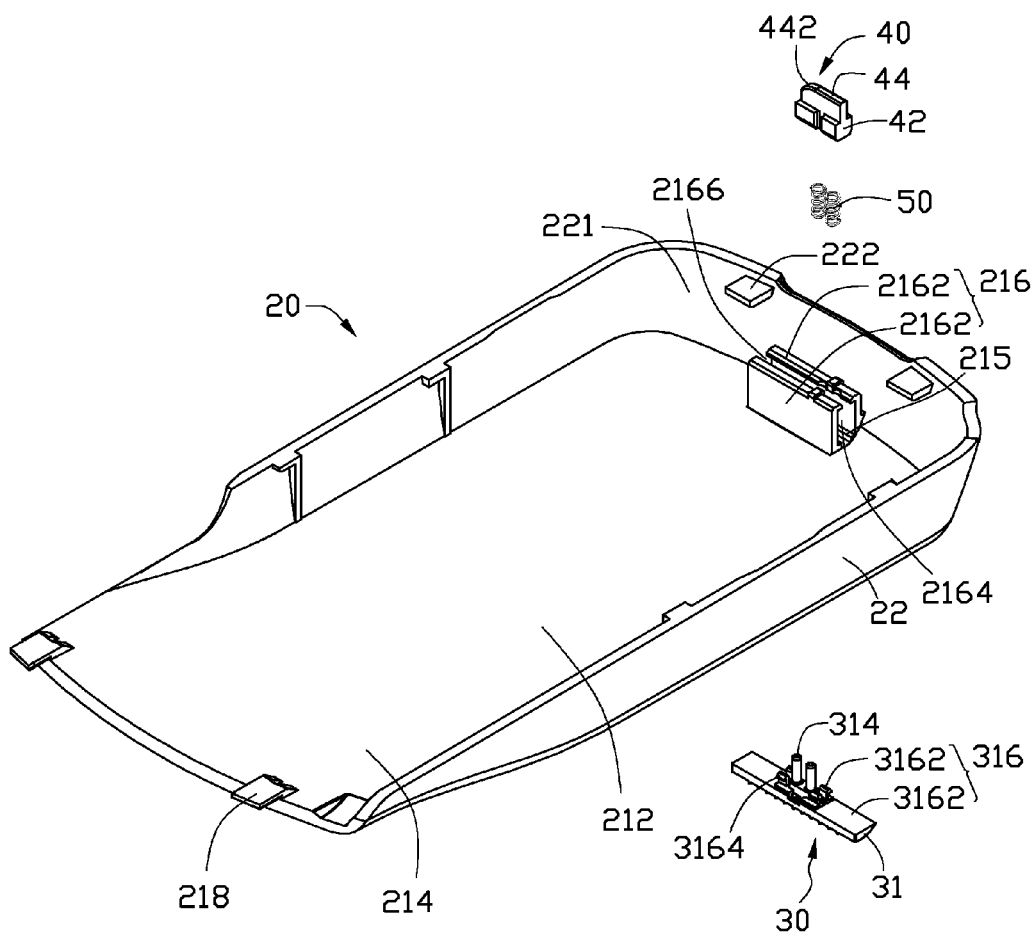
FIG. 2 is a disassembled partial view of the latching mechanism shown in FIG. 1 from another view.

Referring further to FIG. 2, the cover 20 includes a main plate 21 and a peripheral wall 22 connected to the main plate 21. The main plate 21 includes a flat section 211 and a tilted section 212 connecting the flat section 212. The flat section 211 defines a lateral engaging groove 213 at the end of the flat section 211 for slidably receiving the button 30. The bottom wall of the engaging groove 213 defines a guide slot 214 through the main plate 21. Two latching bars 215 protrude from the opposite sidewalls of the guide slot 214 and extend transversely along the guide slot 214. The flat section 211 forms a fixing frame 216 corresponding to the engaging groove 213 in position. The fixing frame 216 includes two parallel clamping walls 2162 positioned at two opposite sides of the guide slot 214. Each clamping wall 2162 is L-shaped. The two clamping walls 2162 enclose a chamber 2164, and a gap 2166. The tilted section 212 forms two first latching blocks 218 on the internal surface. The two first latching blocks 218 extends from an end of the tilted section 212 for latching into the two first latching recesses 114.

The peripheral wall 22 includes an end wall 221. Two second latching blocks 222 protrude longitudinally from the end wall 221. The two second latching blocks 222 are to engage into the two second latching recesses 116 of the housing 10.

The button 30 includes a base plate 31, the base plate 31 has pressing strips 312 formed at the top surface, two fixing posts 314 and two locking assemblies 316 formed at the bottom surface. The pressing strips 312 facilitate the pressing of the button 30. The fixing posts 314 extend perpendicularly to the bottom surface and fit around the two elastic members 50. The two locking assemblies 316 are arranged on two sides of the fixing posts 314. Each locking assembly 316 includes opposite locking units 3162. Each locking unit 3162 laterally extends a wedged hook portion 3164. Each locking assembly 316 can be pressed and passes through the guide slot 214 and the two hook portions 3164 hook with the latching bars 215.

The latching member 40 includes a main portion 42 and an extending portion 44 protruding from a surface of the main portion 42. The main portion 42 can be received in the chamber 2164 of the fixing frame 216 and defines two receiving holes 422 opposite to the extending portion 44. The two receiving holes 422 can partially receive the two fixing posts 314 therein. The extending portion 44 can extend through the gap 2166 of the fixing frame 216; and further can engage into the latching hole 118 to secure the cover 20 with the housing 10. The extending portion 44 has an arcuate surface 442 at the corner for engaging with the slanted wall 1182 for facilitating the engagement of the extending portion 44 sliding into/out of the latching hole 118.

The elastic members 50 may be compression springs. The elastic members 50 can fit around the fixing posts 314 of the button 30 and be compressed between the main portion 42 of the latching member 40 and base plate 31 of the button 30.

Figure 3:
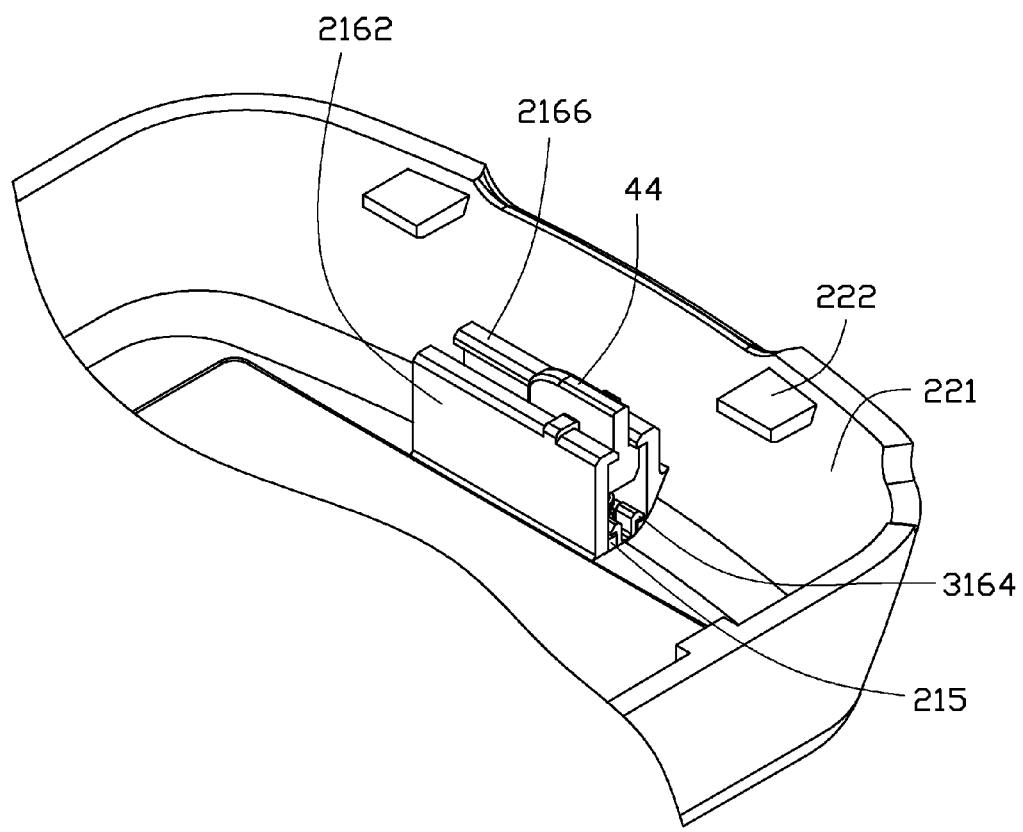
FIG. 3 is an assembled partial view of the latching mechanism shown in FIG. 1.

Referring to FIG. 3, to assemble the button 30, the latching member 40 and the elastic members 50 into the cover 20, the latching member 40 slides into the fixing frame 216. The main portion 42 is received in the chamber 2164, and the extending portion 44 passes through the gap 2166. The elastic members 50 are placed into the chamber 2164. The elastic members 50 are compressed and aligned with the two receiving holes 422. The button 30 is assembled in the cover 20, and the button 30 is compressed. The two fixing posts 314 pass through the guide slot 214 and insert into the two receiving holes 422. Two elastic members 50 fit around the two fixing posts 314, and the latching member 40 is secured with the button 30 horizontally. The two locking assembly 316 pass through the guide slot 214 and the two hook portions 3164 hook with the latching bars 215.

Figure 4:
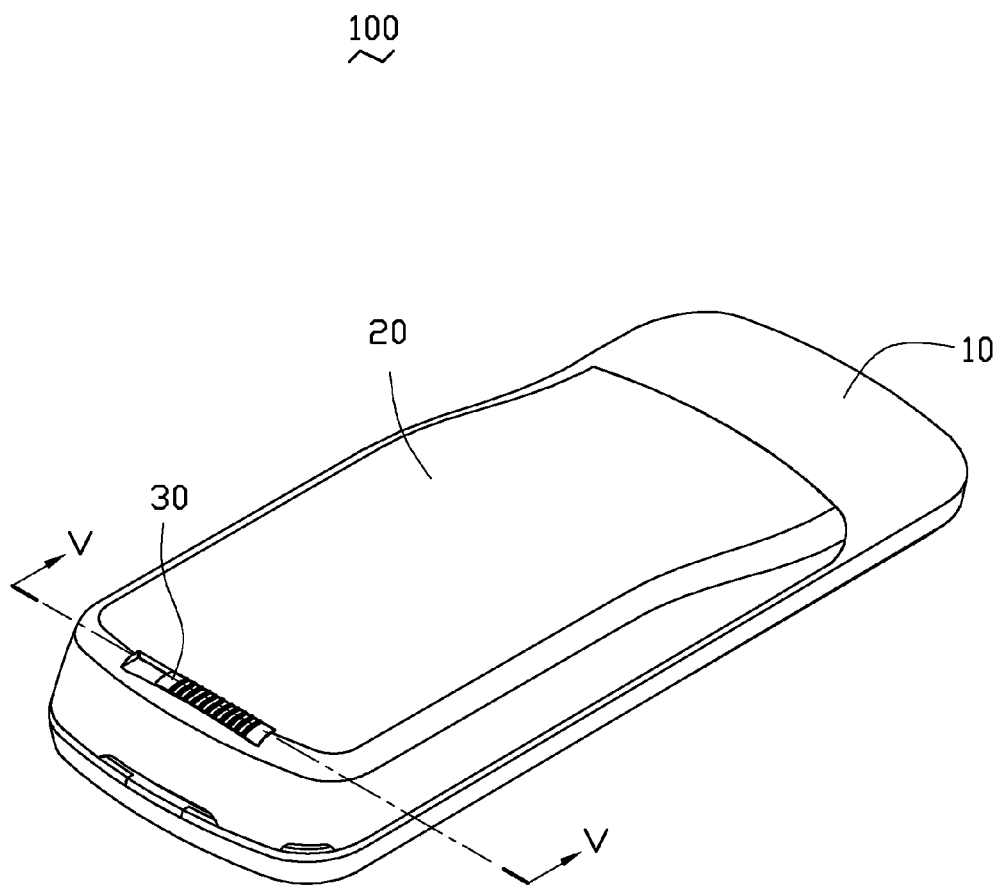
FIG. 4 is an assembled schematic view of the portable electronic device shown in FIG. 1 from another view.
Figure 5:
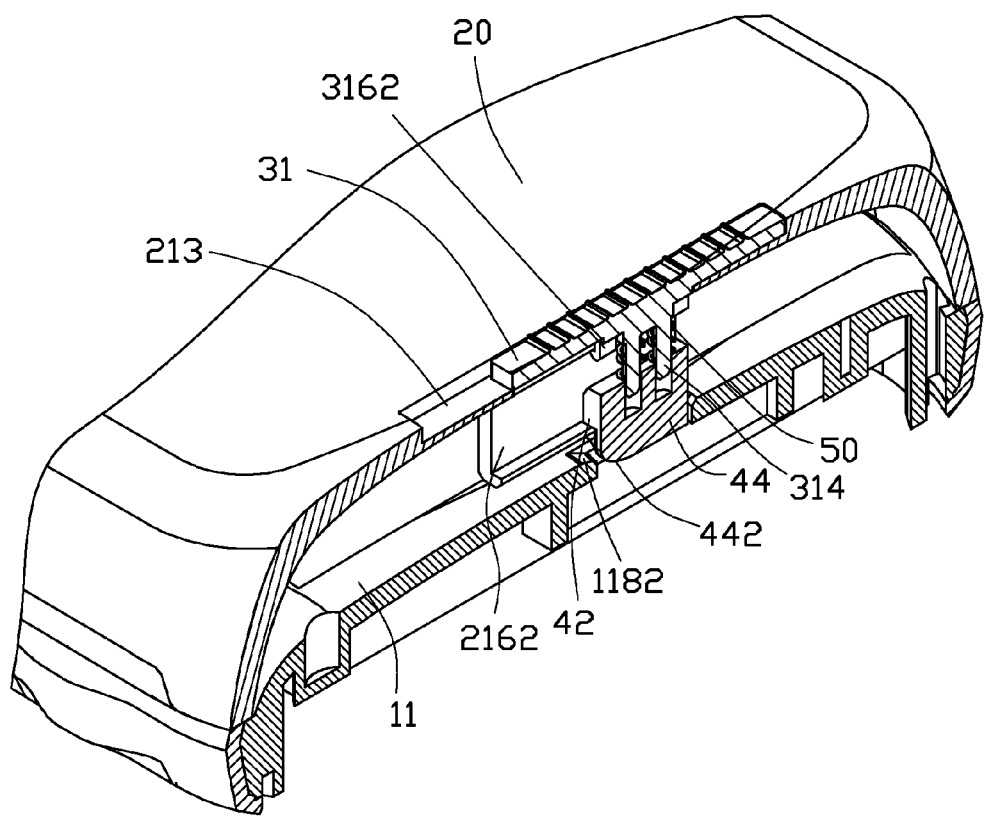
FIG. 5 is a cutout-away view of the portable electronic device shown in FIG. 4 with the latching mechanism latched.

Referring to FIG. 4 and FIG. 5, to latch the cover 20 to the housing 10, the cover 20 is pushed, and the two first latching blocks 218 latch into the two first latching recesses 114. The second latching blocks 222 latch into the two second latching recesses 116. The cover 20 secures to the housing 10 in the second direction. The extending portion 44 extends into the latching hole 118. The cover 20 secures to the housing 10 in the first direction. Accordingly, the cover 20 is latched with the housing 10.

Figure 6:
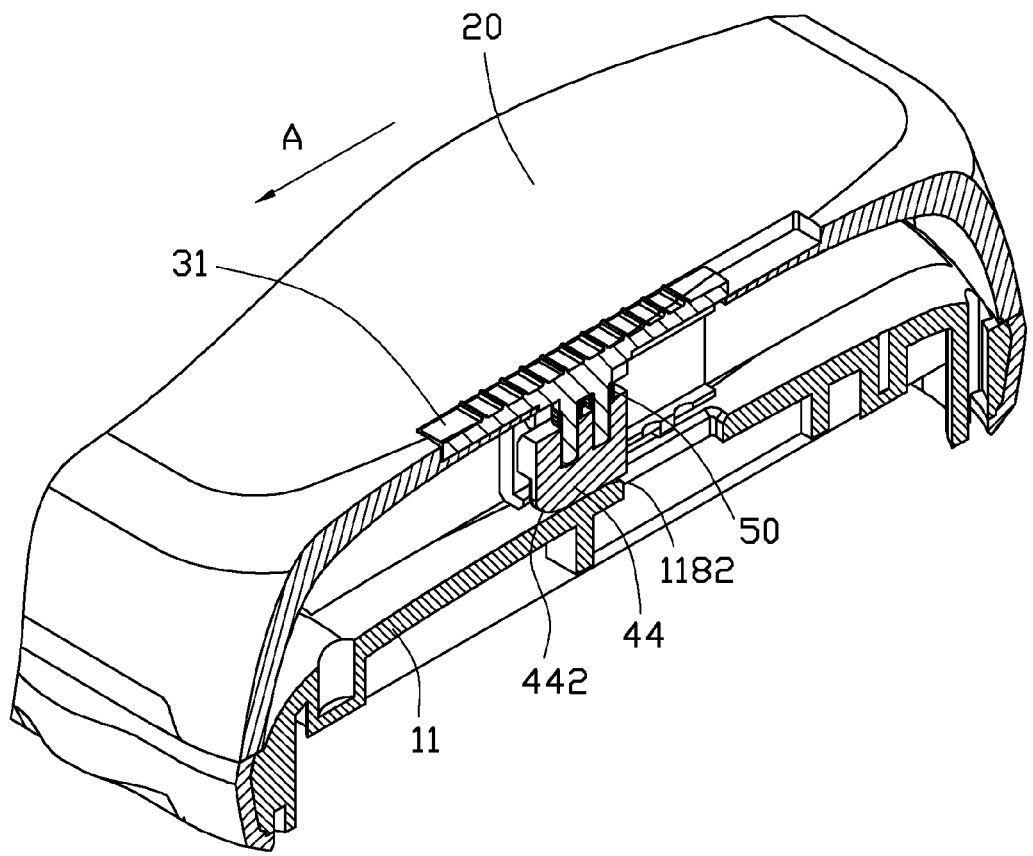
FIG. 6 is a cutout-away view of the portable electronic device with the latching mechanism unlatched.

Referring to FIG. 6, to detach the cover 20 relative to the housing 10, the button 30 is pushed along the direction A while sliding along the engaging groove 213. The sliding of the button 30 causing the latching member 40 to slide along the fixing posts 314. Thereby, the latching member 40 slides out from the latching hole 118 with the elastic members 50 being further compressed. Accordingly, the cover 20 is unlatched along the first direction. By pushing the cover 20 along the first direction, the cover 20 can be removed from the housing 10.

It is to be understood that even though numerous characteristics and advantages of the present exemplary embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A latching mechanism for a portable electronic device, comprising:
   a housing defining a latching hole;
   a cover defining a guide slot along a first direction and passing through cover;
   a button assembled in the cover and movable along the guide slot;
   a latching member assembled in the cover, and secured with the button in a first direction and movable along a second direction, perpendicular with the first direction;
   at least one elastic member assembled between the button and the latching member to bias the latching member along the second direction; wherein:
   the cover latches with the housing in the second direction, the latching member latches into the latching hole to secure the cover with the housing in the first direction, when the button is pushed and slides along the guide slot, the latching member slides out the latching hole to unlatch the cover in the first direction, with the elastic member further compressed.

2. The latching mechanism as claimed in claim 1, wherein the housing includes a latching section, the latching section defines two first latching recesses and two second latching recesses, the cover forms two first latching blocks to latch into the first latching recesses, and two second latching blocks to latch into the second latching recesses, making the cover secured with the housing in the second direction.

3. The latching mechanism as claimed in claim 2, wherein the latching section defines the latching hole, the latching hole has a slanted wall at a lateral side, the latching member includes an extending portion having an arcuate surface, the arcuate surface engages with the slanted wall for facilitating the engagement between the extending portion and the latching hole.

4. The latching mechanism as claimed in claim 3, wherein the cover includes a main plate, the main plate includes a flat section defining an engaging groove at the external surface for slidably receiving the button.

5. The latching mechanism as claimed in claim 4, wherein the button forms at least one fixing post at the lower surface, the engaging groove defines a guide slot at the bottom for passing through the at least one fixing post.

6. The latching mechanism as claimed in claim 5, wherein the button has two locking assemblies formed at the bottom surface, each locking assembly includes two opposite locking units, a hook portion laterally extends from each locking unit, two latching bars oppositely laterally protrude from the sidewalls of the guide slot, each locking assembly can be pressed and passes through the guide slot, the two hook portions respectively hook with the latching bars.

7. The latching mechanism as claimed in claim 5, wherein the flat section forms a fixing frame in the internal surface corresponding in position to the engaging groove, the fixing frame defines a chamber communicating with the guide slot and a gap parallel with the guide slot, the chamber receives the latching member therein and the portion of the latching member extends from the gap.

8. The latching mechanism as claimed in claim 7, wherein the fixing frame includes two parallel opposite clamping walls positioned at two sides of the guide slot, each clamping wall is L-shaped, the two clamping walls enclose the chamber and the gap.

9. The latching mechanism as claimed in claim 4, wherein the cover includes a tilted section smoothly connecting the flat section, the tilted section forming the two first latching blocks in the internal surface.

10. The latching mechanism as claimed in claim 5, wherein the cover includes a peripheral wall including an end wall; the two second latching blocks laterally protrude from the end wall.

11. The latching mechanism as claimed in claim 10, wherein the latching member includes a main portion and the extending portion protruding from the main portion, the main portion can be received in the chamber and the extending portion extends through the gap to engage into the latching hole.

12. The latching mechanism as claimed in claim 11, wherein the main portion defines at least one receiving holes, the at least one receiving holes aligning with the at least one fixing post of the cover and can partially receive the at least one fixing post therein.

13. The latching mechanism as claimed in claim 12, wherein the at least one elastic member is compression spring, the elastic member fits around the at least one fixing post and is compressed between the main portion and the button.

14. A portable electronic device, comprising:
    a housing defining a latching hole, and at least one latching recess;

a cover defining a guide slot along a first direction and forming at least one latching block, the guide slot passing through cover;
a button assembled in the cover and movable along the guide slot;
a latching member assembled in the cover, and secured with the button in a first direction and movable along a second direction, perpendicular with the first direction;
at least one elastic member assembled between the button and the latching member to bias the latching member along the second direction; where in:
the cover latches with the housing in the second direction by latching of the at least one latching block into the at least one latching recess, the latching member latches into the latching hole to secure the cover with the housing in the first direction, the button is pushed and slides along the guide slot, the latching member slides out the latching hole to unlatch the cover in the first direction, with the elastic member is further compressed.

15. The portable electronic device as claimed in claim 14, wherein the housing includes a latching section, the latching section defines two first latching recesses at an end, and two second latching recesses at the other end, the cover forms two first latching blocks to latch into the first latching recesses, and two second latching blocks to latch into the second latching recesses.

16. The portable electronic device as claimed in claim 15, wherein the latching section defines the latching hole, the latching hole has a slanted wall at a side, the latching member includes an extending portion having an arcuate surface, the arcuate surface engage with the slanted wall for facility of the extending portion sliding into/out the latching hole.

* * * * *

UNITED STATES PATENT AND TRADEMARK OFFICE
CERTIFICATE OF CORRECTION

| | | |
|---|---|---|
| PATENT NO. | : 8,345,422 B2 | Page 1 of 1 |
| APPLICATION NO. | : 12/905219 | |
| DATED | : January 1, 2013 | |
| INVENTOR(S) | : Rui-Hao Chen et al. | |

It is certified that error appears in the above-identified patent and that said Letters Patent is hereby corrected as shown below:

On the title page insert the following:

--(30)    Foreign Application Priority Data

August 11, 2010   (CN) ....................2010 1 0250969--

Signed and Sealed this
Twenty-sixth Day of November, 2013

Margaret A. Focarino
*Commissioner for Patents of the United States Patent and Trademark Office*